Feb. 18, 1941.   H. W. F. LORENZ   2,232,544
PROCESS FOR THE MANUFACTURE OF SOAP AND RECOVERY OF THE
GLYCERIN AND OTHER VOLATILE UNSAPONIFIABLE MATTERS
Filed Oct. 25, 1937
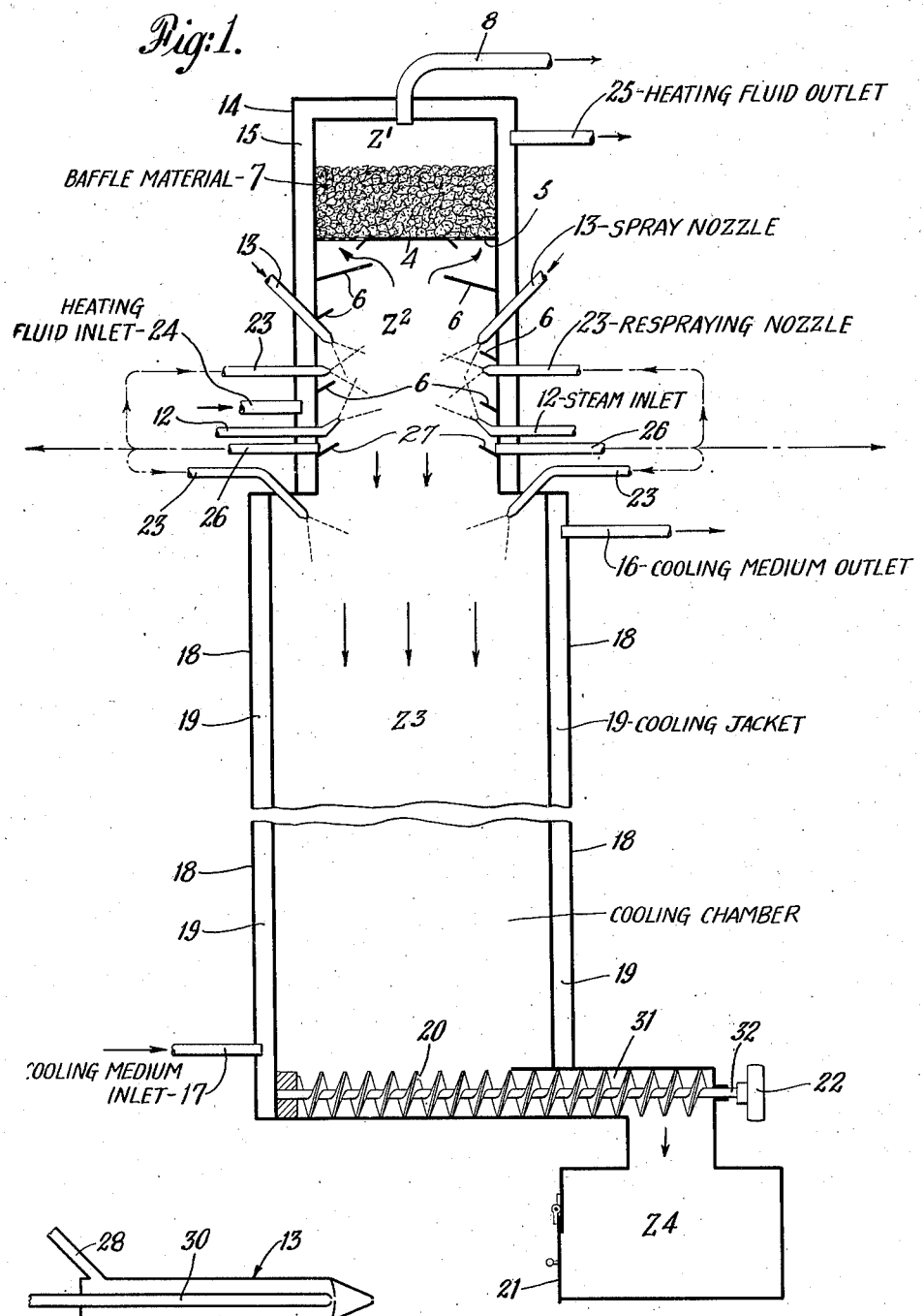
INVENTOR
HENRY W. F. LORENZ
BY
Thos. R. MacDonald
ATTORNEY Patented Feb. 18, 1941

2,232,544

UNITED STATES PATENT OFFICE

2,232,544

PROCESS FOR THE MANUFACTURE OF SOAP AND RECOVERY OF THE GLYCERIN AND OTHER VOLATILE UNSAPONIFIABLE MATTERS

Henry W. F. Lorenz, Jersey City, N. J.

Application October 25, 1937, Serial No. 170,726

7 Claims. (Cl. 260—418)

This invention relates to processes for the manufacture of soap, glycerin and other products from such saponifiable matter as animal and vegetable oils and fats; it also relates to the manufacture of soaps from crude oxidation products particularly those derived from hydrocarbons of petroleum, shale, brown-coal, etc.

The invention involves among other things a novel and useful employment of superheated steam, as will appear hereinafter in the description of my invention and in the claims.

The process herein disclosed is particularly suited for obtaining soap in a more or less globular or granular form, or as a fine or coarse powder.

In my patent application Ser. No. 353,849 (Ser. of 1915), filed January 24, 1920, I have disclosed, among other things, a "process of manufacturing soap and glycerin, which consists in spraying the mixture of saponifiable matter and alkali into a heated retort or other receptacle, passing steam into said retort, while maintaining a vacuum, and collecting the products of the distillation." I also have disclosed, "a process of manufacturing soap and glycerin, which consists in spraying separately into a heated retort saponifiable matter and alkali in such a manner that the two sprays become intimately mixed in said retort, passing steam through the retort, maintaining a vacuum in said retort and collecting the products of the distillation."

It is a process based in part upon the disclosure of the foregoing application that I desire particularly to describe and claim in this present application.

I am aware that there are certain known soap-making processes of a batch nature which are conducted at, above, or below atmospheric pressure and in which steam of various temperatures, is employed as a distillation or heating agent. I am also aware that soap-making processes have been described in which previously prepared aqueous soap is sprayed or otherwise introduced with or without steam into a receiver maintained at, above, or below atmospheric pressure, or in which a mixture of a fat and a base is subjected to a relatively high temperature and to a high pressure in an externally heated narrow elongated reaction tube to effect saponification, and is then discharged in spray or other form into a receiver maintained at ordinary or under reduced atmospheric pressure.

None of these processes accomplishes the results desired and obtainable through the use of present invention which, among other things, is characterized by the employment of superheated steam or other readily condensible, non-oxidizing gaseous or vaporous fluid medium.

My continuous processes can be carried out in a number of ways and with a variety of apparatus without departing from the spirit of my invention.

In the manufacture of soap from animal, vegetable and marine animal oils and fats, soap and glycerin are obtained. Of these two soap is the most important, and for this reason the methods of saponification known prior to my invention have been designed primarily to yield soap. All of the known processes involve appreciable sacrifice in both the quality and quantity of glycerin produced.

The importance of glycerin as a product has grown so that for some years past this sacrifice in the yield of glycerin has constituted an appreciable but apparently unavoidable waste. Most glycerin of commerce is set free i. e. obtained by the soap making processes.

Basic or alkaline materials are employed in the treatment of fats and fatty oils for preparing soaps and glycerin. Usually, also, various kinds of additions are made to the finished soaps.

Fats and fatty oils contain chiefly substances known as glycerides. These belong to the class known in chemistry as esters.

Esters are combinations of alcohols with acids. They may be viewed as derivatives of the alcohols, in which the alcoholic-hydrogen has been replaced by an acid radical, or as derivatives of the acids, in which the hydrogen replaceable by metals has been substituted by an alcohol radical.

Glycerol being a trihydric alcohol, i. e. containing three alcoholic groups in the molecule, one molecule of the same may combine with three molecules of an acid such as a fatty acid.

The fats and fatty oils are in the main such glycerol esters of fatty acids, i. e. combinations formed by the union of one molecule of glycerol with three molecules of a fatty acid, in other words, glycerides.

The fatty acids found in fats and fatty oils are mostly of high molecular weight and vary somewhat in chemical constitution, some are called saturated fatty acids, others unsaturated fatty acids, while there may be present in some fatty oils so called oxy-fatty acids. These latter contain an hydroxyl group besides the usual carboxylic acid group in the molecule. High molecular weight fatty acids are those containing from eight carbon atoms upwards per molecule.

A glyceride molecule may be split up so that with the proper distribution of the hydrogen and oxygen atoms of three added molecules of water there will result three molecules of fatty acid and one of glycerin. When the splitting up is done with an alkaline material, such as caustic soda or caustic potash, the fatty acids react with the latter and form soaps and glycerin is set free. This reaction is known as saponification and is favored by heat, intimate contact, stirring, etc., and by alkali concentration.

Again, free fatty acids, as such, readily combine or react with alkalies or alkali carbonates, to form soap in a manner akin to the usual interaction of acids and alkalies, or acids and alkali carbonates, etc.

The neutralization of free fatty acids of high molecular weight, i. e. those containing from eight carbon atoms upwards, by means of basic materials is also called "saponification" of the fatty acids.

Fatty oils and fats generally contain small quantities of various saponifiable and unsaponifiable substances in addition to the fatty acids and glycerin. Some of these substances may be very objectionable for soap-making purposes, others like certain vitamins, sterols, such as cholesterol, and phytosterol, and traces of lecithins, waxes, etc. are palpably useful and sought for in many arts. Certain of the objectionable materials often cause extremely objectionable odors in the finished soap and may exert an objectionable catalytic influence therein favoring rancidity, or they may also cause a decrease in lathering qualities in the finished soap, or discoloration.

The most common method of soap making now in use involves the saponification as a batch operation of comparatively high grade fats and fatty oils in open or covered soap pans or kettles with the aid of moderate steam heat and agitation at atmospheric pressure.

Soap kettles are usually 12-20 ft. in diameter and 20-40 ft. high. They are heated by injected steam. In such an open kettle the soap boiler will process 30,000 to 150,000 pounds of fats and oils during a period of 2-5 hours, saponifying the fats and oils as they come in with lyes which have been used previously on other batches for other parts of the process and fortified by fresh lye additions. The boiling is continued until practically all of the fat and all of the alkali have combined. The soap maker judges the progress of the saponification by the appearance feel and taste of the mass.

After saponification is practically complete and the lye has been "killed" (i. e. approximately neutralized) salt or a salt solution is added and boiled through the mass.

When the steam is turned off, the spent lye sinks and the soap floats. Each such boiling operation may be called a "change," because one lye is taken off and another replaces it for the next operation.

The soap, glycerin, salt, excess alkali and water (containing various water-soluble impurities) mixture is finally "settled," and there is formed a top layer of soap with some glycerin and a bottom layer of an aqueous mixture of salt, some alkali, glycerin and various water-soluble impurities. The bottom layer, i. e. aqueous layer, is saved for recovering the glycerin.

The glycerin divides up between the soap lye and the soap, a very considerable proportion being retained by the soap phase. A considerable number of "washings" are necessary for the removal of the greater portion of the glycerin, still some of the latter is retained in the soap.

In order to recover the glycerin from the soap lyes chemical treatments, filtration and distillations are required, during which unavoidable losses of glycerin occur.

Thus in every step of the soap making process losses of glycerin occur. A very appreciable amount of glycerin remains unextracted in the soap, and further quantities thereof are lost during the working up of the soap lye.

The separated soap layer is reworked to ensure a good finished soap, which entails additional loss of time, labor, and material.

In any of the common soap-making processes the bulk of water involved in the extraction of the glycerin is many times the bulk of glycerin produced. The cost of handling and evaporating this extremely large bulk of water is high. The process of my invention may be so operated that the glycerin is produced in concentrated form without intermediate steps in which large quantities of water must be handled and evaporated, and, whereas by present processes not over 85% (in many plants only 70-80%) of the glycerin is recovered, by my process substantially all of the glycerin, e. g. over 99%, may be recovered.

My invention also contemplates the manufacture of new and useful soaps from crude oxidation products derived from mineral oils, such as petroleum, oils of shale, brown-coal, hydrogenation products containing high boiling hydrocarbons, etc. These crude oxidation products may be those which are formed by any of the well known processes for partially oxidizing said hydrocarbons, but the steps employed in bringing about the oxidation of said hydrocarbon products constitute no part of this invention.

The crude oxidation products formed from petroleum heavy oils, paraffin, etc., are a mixture containing quite a number of various products. Among these products are fatty acids, oxy fatty acids and lactones of high molecular weight suitable for making soap when properly separated and treated. By my process I not only obtain soap from the true fatty acids contained in said oxidation products of high molecular weight but, due to the high temperatures that I may employ, I also obtain a chemical conversion, other than saponification, which converts the soaps formed from oxy-acids, or soaps formed from lactones and other saponifiable matter, into soaps containing oxygen only in the carboxylic groups, i. e. soaps of desirable unsaturated acids. Heretofore soaps made from these fatty acids, etc. have been found unfit for use, due to certain objectionable qualities, disagreeable odors, low lathering properties, etc. I therefore obtain good soap from crude acid products obtained by oxidizing petroleum, paraffin, etc.

The chief objects of my invention are:

1. To expedite to a great extent and considerably cheapen the manufacture of soap and glycerin from fatty oils and/or fats;

2. To provide a process whereby soap may be produced directly in a continuous process from soap making raw materials; that is, a process by which the raw material needed for the production of soap is fed continuously into an apparatus in which the soap is formed and from which the soap is continuously delivered;

3. To provide a process for producing soap in a continuous, rapid, economical and efficient manner, as compared with the batch method of operation of the ordinary known processes heretofore employed;

4. To provide a process for producing soap continuously in which the soap is produced in solid form of any suitable shape, in a finely divided state, in the form of granules or globules, or a powder, and in substantially anhydrous condition from the raw materials, the size of the granules or globules being not critical and being variable to suit various needs;

5. To provide a process for obtaining a soap of improved quality, such as whiter in color and generally high purity;

6. To provide a process for obtaining a good soap directly from crude fatty oils and fats that by present ordinary commercial soap making processes must first be refined;

7. To provide a process for producing soap in which the moisture content of the soap produced can be regulated within any desired limits, if moisture in the soap is desired;

8. To provide a process for facilitating the recovery of the glycerin;

9. To provide a process for recovering substantially all of the glycerin contained in the fatty oils and fats used;

10. To provide a process for distilling and recovering the glycerin as a part of the continuous process, all of which contributes to a very great cheapening of the cost of production of the soap and the glycerin;

11. To provide a process whereby a substantially complete saponification of saponifiable materials, such as fats and fatty oils is obtained;

12. To provide a process whereby a substantially complete separation of volatile matters, present in and formed from the saponifiable materials, from the non-volatile soap is accomplished;

13. To provide a process for recovering sterols from fatty oils and fats;

14. To provide a process for producing a good soap from oxidation products from petroleum, shale oil, paraffin, etc., and, 15. To provide further objects and advantages as will become apparent and made evident hereinafter.

In the accompanying drawing, which is purely diagrammatic, Fig. I denotes a retort or reaction vessel in the form of a vertically positioned elongated cylinder having a casing 14 at its upper end which completely surrounds the upper end or section of the retort or vessel and is spaced therefrom to form a heating chamber 15 about the zones $Z_1$ and $Z_2$ of the vessel. While other methods of heating this section (zones $Z^1$ and $Z^2$, vid. below) of the retort or vessel may be resorted to, I prefer the method of indirect heat exchange using a suitable high-boiling substance as a heating medium (such substances for heat-transferring are commercially available), such as an oil of high boiling point, or a low-melting metal or alloy, etc., which is pumped in a heated fluid condition into the heating chamber 15 through an inlet conduit 24 which leads from suitable heating apparatus (not shown), wherein said heating fluid may be and is heated to any desired temperature, a continuous circulation being provided for. If desired the heating medium may also be in the form of a heated vapor or a gas. For example mercury vapor may be obtained by boiling mercury whose vaporizing temperature may be regulated to a desired value by varying the pressure on the heated, boiling mercury. The heating medium courses through the heating chamber 15, and passes out through discharge conduit 25 at its upper end by which it is returned to the heating apparatus. A constant circulation of the heating medium to and from said heating apparatus is maintained in the closed circuit. This part of the retort or vessel is preferably kept at a temperature of from about 250 to about 330° C. by the circulating medium.

Surrounding the lower section of the retort below the casing 14 but separate therefrom is another casing 18 spaced therefrom about the zone $Z_3$ to form the cooling chamber 19. A suitable cooling medium is circulated through chamber 19 being supplied thereto by means of the ingress pipe 17 and being removed therefrom by the egress pipe 16. This part of the apparatus, i. e. of the zone $Z_3$ retort, is preferably kept at a temperature of from about 100° C. to about 200° C. The cooling medium employed may be low temperature steam, or may be some other fluid having a condensing temperature somewhat above the condensation temperature of steam.

It will be observed that the inside of the retort is roughly divided into three zones ($Z^1$, $Z^2$, $Z^3$), which zones are openly interconnected. Zones $Z^1$, $Z^2$ are preferably kept at a temperature in excess of the melting point of the resulting anhydrous soap while zone $Z^3$ is maintained at a temperature preferably considerably below the melting point of the resulting anhydrous soap.

The lower end of the retort is provided with soap discharge conduit 31 through which the finished soap is adapted to be removed by the Archimedean screw 32 rotated by any suitable means such as the pulley wheel 22 driven by a prime mover (not shown). This screw conveyor in conjunction with the soap being removed from the zone $Z^3$ of the retort provides a vacuum trap or seal, preventing the ingress of air into the retort when diminished i. e. sub-atmospheric pressure is employed in the same.

In Fig. 2 I have shown a form of compound spraying means or nozzle 13. To such a spraying nozzle are conducted heated saponifiable oil and/or fat through pipe 28. Pipe 29 supplies heated alkali material, and pipe 30 supplies superheated steam. Very efficient spraying nozzles for my purpose are available and form no part of my invention. I may avail myself of any type most suitable for my purpose.

Thus it will be seen that the fatty oils and/or fats to be saponified, preferably preheated, the preferably preheated basic medium and the superheated steam pass through pipes 28, 29, 30, respectively in properly regulated proportions or ratios, such as by means of ratio flow controllers, or by other means, to the compound spraying nozzles 13, Fig. I, and are sprayed thereby in commingling relationship preferably downwardly into zone $Z^2$ of the retort or reaction vessel. Alternately, however, the three materials, oil, alkali, steam, may be sprayed into zone $Z_2$ by separate spraying nozzles, arrangement being made in that case so as to have the three sprays commingle intimately within the zone $Z_2$.

It is also understood that an atmosphere of superheated steam is maintained in zones $Z^1$, $Z^2$, entering through pipes 12 into zone $Z^2$ as a spray and intimately contacting in counter-current the sprayed material mixture entering zone $Z^2$ through nozzles 13.

Zone $Z^1$ is separated from zone $Z_2$ by a perforated or sieved member 5 having a non-perforated disc-like centre portion 4, and is partly filled with contacting or arresting material 7, such as particles of coke, or other material, or Raschig rings, etc. This is a matter of some importance. The object of having the material in zone $Z^1$ is to arrest and coalesce such finer soap particles as would otherwise be carried upwardly as minute liquid soap particles by the passing current of steam, glycerin vapors and the like, and thus pass into conduit 8 leading to a condenser (not shown).

These fine, dust-like particles, otherwise not capable of dropping downwardly, combine with one another, coalesce and form larger liquid soap particles which then flow downwardly and are guided by member 5, 4 into the spiral trough 6 arranged spirally in zone $Z^2$, which empties finally into circular trough 27.

This spirally arranged trough 6 is, of course, attached to the inside wall of zone $Z^2$ to gather also such liquid soap particles as may strike the walls of zone $Z^2$ from the sprays. The trough ends in a circular trough 27. Such hot, liquid soap of zone $Z^1$ and the walls of zone $Z^2$ as is conducted to the pool in trough 27 is removed therefrom by means of conduits 26 and if desired is recycled as a liquid to the re-spraying nozzles 23 which may be directed as shown, or placed so as to spray the recycled liquid soap from pool in trough 27 directly into zone $Z^3$, or both modes of placement may be used.

Pumping means for circulating the hot liquid soap from the trough 27 via conduits 26 to the spraying nozzles 23 are not shown but it is obvious that the liquid soap must be kept at a temperature during transit at which it possesses sufficient liquidity to ensure ease of circulation.

The liquid soap particles, sprayed into or formed in zone $Z^2$, fall downwardly by gravity into and in the elongated vertical cooling zone $Z^3$ (as indicated by the arrows), and are cooled and solidified as separate particles in their descent by reason of the cooling effect exerted by the cooling medium circulating through cooling chamber 19. The soap collects at the bottom of zone $Z^3$ as a granular or powdery soap and is conducted therefrom by means of the spiral conveyor 32 into a soap accumulating chamber $Z^4$. Access to this chamber may be had through the door 21 for removal of the soap.

Depending upon the nature of the spraying nozzles, the spraying pressure, etc., the soap or soap mixture can be sprayed into the zone $Z_2$ as particles of various sizes. The spraying pressure, also, may be varied, etc. Zone $Z^3$ may be considerably elongated, i. e., possess a considerable height, to insure a proper working of the process.

The current of superheated steam entering through pipe 12, preferably as a spray, carries the glycerin and other volatiles upwardly serially through the zone $Z_1$ conduit 8 to a suitable condenser, or condensing apparatus (not shown).

A conduit or pipe 8 for taking off the volatiles, e. g. glycerin, water vapor, etc., leads to a condenser, condensate receiver, and, if employed, an evacuating means (not shown).

It is intended that a vacuum or diminished pressure shall preferably be used and maintained within the retort by means of suction operating through pipe 8, though, as stated, a vacuum may be dispensed with.

The temperature maintained in zones $Z^1$ and $Z^2$ shall always be above the melting point of the resulting anhydrous soap, so as to keep the formed and sprayed soap in a thinly liquid condition, and, necessarily, above the vaporizing point of the glycerin under the prevailing pressure conditions.

As the heated fats and/or fatty oils and the preferably heated alkali or basic medium or material and superheated steam contact each other in the compound spraying nozzles 13 and with the superheated steam passing more or less counter-current-wise through zone $Z^2$, saponification occurs substantially instantaneously, liberating the glycerin and other volatiles and the moisture, and forming soap.

The basic medium will, ordinarily be caustic soda.

Zone $Z^1$ may contain, instead of the arresting and coalescing filling material mentioned, an electrical precipitating means (not shown) of the Cottrell or other type, using, for instance, a high tension electric current for causing agglomeration of such fine soap particles (which would otherwise not readily precipitate, but tend to pass through conduit 8), with resultant precipitation. The object, as stated above, is to prevent any soap particles being drawn into said pipe 8.

Such an electrical precipitating device may also be arranged in zone $Z^3$, if desired. The device may be of the Lodge, Twaite, Cottrell, or other type. Thus, as Lodge has pointed out, when an alternating electromotive force is applied to a suspension in a gas or vapor the action consists for the most part in an agglomeration of the suspended particles into larger aggregates out in the body of the suspending medium and a corresponding more rapid settling of these aggregates under the influence of gravity. The reason for this coalescing of the particles is that the particles become electrified or polarized by the high potential discharge of electricity and attract each other to opposite poles.

In Fig. I only six spraying nozzles are shown. It is intended that plural number of such nozzles shall be arranged inside and around the circular zone $Z^2$.

The three so called zones $Z^1$, $Z^2$, $Z^3$, being continuous and interconnected one with the other, contain steam under practically the same pressure conditions, but of different temperatures.

The steam passing into and through zones $Z^1$, $Z^2$, as already repeatedly noted, has a temperature above the melting point of the resulting anhydrous soap, while the steam is practically the whole of zone $Z^3$, excepting its uppermost part, is kept at a temperature below that of the melting point of the resulting anhydrous soap, for instance, 100–200° C.

The atmosphere of steam, moreover, in zone $Z^3$ is in a more or less quiescent state, while the atmosphere of steam passing through zones $Z^1$ and $Z^2$ is in turbulent, agitated, flowing motion.

Zone $Z^4$ may contain steam of a low temperature, or an inert gas or vapor, to prevent any air leaking back into the reaction chamber when reduced pressure is used therein.

Naturally, if steam is permitted to condense in zone $Z^3$, or if water is sprayed into zone $Z^3$, a hydrous soap of any desired water content may be obtained in said zone $Z^3$.

One method of carrying out my invention is as follows:

For instance, the saponifiable oil and/or fat, preferably previously heated to say 250–325° C., and the alkali solution, also previously and separately heated, preferably, to say about the same temperature, are continuously sprayed by the spraying nozzles 13 in commingling relationship into the zone $Z_2$ of the section top of a reaction vessel or retort I through which section passes a current of superheated steam injected through the pipes 12 and heated to a temperature in excess of the melting point of the resulting anhydrous soap. The contents of the retort are maintained under atmospheric pressure, superatmospheric pressure or, preferably, under reduced, sub-atmospheric pressure. The saponifiable oil and/or fat and alkali solution are mixed in such proportions and ratios, i. e. molecular proportions, that all of the alkali will be eventually combined with the acidic materials or radicals contained in said fatty oil and/or fat to form a neutral soap.

On entering zone $Z_2$ of the reaction vessel or retort the saponifiable oil and/or fat and alkali solution, mixed in commingling relationship and intimately contacting at the same time a current of superheated steam entering said zone $Z_2$ at a lower level and passing upwardly more or less in counter-current to the more or less downwardly sprayed saponification mixture, instantly react and the fatty oil and/or fat is instantly saponified.

The soap drops downwardly and collects in a globular, granular or powder form at the bottom of the retort, which can be of the nature of a soap spraying tower, whence it can be continuously withdrawn by the screw conveyor 32 to the soap collecting chamber.

The volatile matters, including the glycerin and water vapor, are continuously drawn off via the conduit (Fig. 1, 8) at the top of the retort, preferably by suction means, passing through a condenser not shown and collecting in a receptacle for the condensate (not shown), whence they also may be continuously withdrawn by a special removal means (not shown). During the whole continuous operation a reduced pressure is preferably maintained in the system.

It is understood, of course, that the process may also be carried out in a similar manner under atmospheric pressure or even under superatmospheric pressure, hence without the employment of a vacuum, or reduced pressure.

It is also understood that the saponifiable oil and/or fats and the caustic alkali solution may be sprayed separately as such into the reaction chamber or retort in such a manner that the two sprays intimately co-mingle and react in said chamber or retort; or they may be sprayed together by means of a compound mixing and spraying nozzle. Again, the saponifiable oils and/or fats and the alkali solution may as in Fig. I be sprayed together and in conjunction with superheated steam in commingling relationship by means of a compound spraying nozzle.

The saponification of the glycerides or esters of high molecular weight, or the saponification or neutralization of acidic materials of high molecular weight, containing unsaponifiable matters, may be accomplished in a prior stage and the saponified mixture, preferably heated to a temperature in excess of the melting point of the resulting anhydrous soap, then continuously counter-currently sprayed and extracted with the aid of superheated steam and reduced pressure, according to my invention, or, as stated, the saponification step, or neutralization step, may occur simultaneously with the extraction step.

In soap making, hence, my process contemplates, for instance, the continuous heating and treating of the soap making materials and the saponifying medium in a continuously sprayed stream containing the mixed reactants in the desired proper proportions, more or less counter-current-wise with superheated steam, preferably under reduced pressure conditions, condensing the volatiles and separately collecting the condensed volatiles, and the soap.

It will be noted and understood that an important step in my continuous process is the use of superheated steam, i. e. a current of superheated steam into which the previously saponified fats and/or fatty oils, or the fats and/or fatty oils in conjunction with the basic material (with or without superheated steam) are sprayed more or less counter-current-wise. This current of superheated steam (a) aids in maintaining the sprayed material at the proper operating temperature, (b) ensures intimate contact of the soap making materials with the superheated steam, (c) ensures full and complete saponification, (d) ensures a rapid and complete separation of the glycerin and other volatiles from the formed soap, (e) ensures the rapid and complete removal of the separated glycerin and other volatiles from the reaction and extraction vessel, by sweeping these out of the latter to the condenser, (f) ensures a completely non-oxidizing atmosphere in the reaction and extraction chamber, (g) ensures other advantages, as will appear and be apparent to those skilled in the art, all of which combined, as well as separately, represent an important advance over presently known soap-making processes.

It is understood that by my process I ordinarily obtain a dry globular or granular soap, or a pulverent soap. In regard to the sprayed soap particles, their size, shape and structure may be varied by my process within certain limits. This can be accomplished by varying the construction and/or operation of the spraying means, the range of the pressure used in spraying, the quantity of the superheated steam, etc. If suitable quantities of water are sprayed or added into zone $Z^3$ a soap of any desired water content results.

The glycerin and water vapors may be substantially completely separated from one another by well known fractional condensations, or, they may be condensed together. The condensation of the vapors may be carried out stepwise, to obtain glycerin of a high degree of concentration in one and the same operation. Again, in another modification of my process, in the treatment of the volatiles removed from the reaction chamber, the temperature of the steam, carrying the glycerin and other volatile non-saponifiable matters, is reduced to a point below the boiling point of the glycerin under the prevailing pressure conditions, to condense the glycerin vapors and the vapors of other unsaponifiables of like and superior boiling points, and the steam is subsequently again superheated and recycled for the purpose of treating further soap-making materials in the continuous process.

As my process requires that the material under treatment possess sufficient liquidity at the operating temperature employed in the countercurrent spraying, where it is being treated with a readily condensable gaseous or vaporous medium or fluid, e. g. steam properly superheated, the temperature of the saponified material must naturally be sufficiently high for the purpose.

The preferable temperature to be used in my continuous process in ordinary soap making may vary from 250–325° C., although I do not limit myself to these temperatures. The temperature may be below 250° C. or even considerably above 325° C., depending upon the nature of the material being treated and the purpose thereof. Ordinarily I would prefer a temperature range of from 250–325° C. Again the temperature may vary or be varied at different steps or stages of my continuous process, also, I need not confine myself to an exact, definite temperature applied to the whole process.

When reduced pressure, or a vacuum, is employed, this may be anywhere below atmospheric pressure, i. e. from a slight sub-atmospheric pressure to a high vacuum.

As already stated, the oil and alkali solution can be sprayed separately in proper proportions into the reaction vessel in such a manner that the two sprays co-mingle, preferably in this case at the point of entrance into the reaction vessel. While the spraying can be accomplished also with an inert gas or vaporous medium (air being always strictly excluded), I prefer to use steam, preferably superheated, for the purpose.

It will be understood that in the separation of unsaponifiable matter from saponifiable materials containing the same, the saponifiable material and alkali or basic media are projected into the reaction and extraction chamber in equimolecular quantities, that is to say, there is just enough alkali or basic media projected into the chamber to saponify all of the saponifiable materials to be saponified. In other words, it follows, therefore, that there will be no free alkali or unsaponified saponifiable material contained in the finished soap. However, I may use a slight excess of the alkaline or basic media when this is found desirable.

For regulating the supply of saponifiable material and basic media well known "mixture proportioning devices," "proportion controllers," etc., are employed.

In carrying out my processes, depending upon the nature of the saponifiable material used and the result desired, I may employ as saponifying agents such bases or basic materials, or mixtures of the same, as dissolved, semi-dissolved, or dry alkalies, or earth alkalies, alkali carbonates or earth alkali carbonates, or other metals, or nitrogenous bases, such as ammonia, or aminocompounds, which form soaps.

It will be obvious, of course, that the basic material can be sprayed into the retort or reaction vessel in an anhydrous or semi-anhydrous form, and that the steam, i. e. stream or current of steam would in such a case furnish any water that might be required in the saponification reaction.

Saponifiable oils and fats, besides containing as chief ingredients glycerides of various fatty acids, usually contain certain small percentages of unsaponifiable substances, including vitamins, sterols (free and/or as esters), such as cholesterol, $C_{27}H_{44}O$, occurring in all animal fats from about 0.2–1%, and phytosterol, $C_{26}H_{44}O$, present in approximately like amount in all vegetable oils and fats, also wax-like lecithins, etc. "Vitamin A alcohol" is contained in fish-liver oils.

When I speak in this specification and in the claims of the separation of "volatile unsaponifiable matter," I intend the term to include, besides glycerin and other voltailes, members of the class of sterols, whenever any of these substances are present in or are formed from the respective raw material used.

Sterols are bodies contained in the volatile unsaponifiable matter of animal, vegetable and marine animal oils and fats. They occur in these fats and fatty oils in part free, in part as esters of fatty acids of high molecular weight. In the ordinary soap-making processes they remain in the finished soaps, being more or less insoluble in the aqueous lyes.

Sterols are alcohols, as indicated by the characteristic —OH group contained in the sterol molecule, possess a more or less complicated molecular structure and possess a high molecular weight. They are, moreover, classed as polycyclic alcohols and contain in addition to the alcohol group, —OH, various hydrocarbon side chains, in part unsaturated in character.

"Phytosterol" has more recently been found to be not a single compound but a mixture containing sitosterol, stigmasterol, etc., which also are polycyclic alcohols of varied constitution.

"Cholesterol" has been found to contain ergosterol ($C_{27}H_{42}O$), also a polycyclic alcohol, and of vitamine importance.

Irradiated cholesterol and phytosterol have recently been identified with the class of vitamines, irradiated cholesterol being identical with vitamine "D." I can obtain the sterols by my process in a practically pure state. Likewise, I can obtain "vitamine A alcohol" from fish-liver oils.

My processes hence include the recovery of cholesterol, phytosterol, and other sterols, etc., that are contained in the materials that may be employed for soap-making purposes.

The vitamine nature of the sterols represents only a part of their value and efficiency and future usefulness. They and their derivatives possess other marked physiological properties. Thus, they are considered to counteract and to be antidotal to dangerous blood-poisons—the saponins—which are naturally present in many foodstuffs. They are also antidotes for toxins produced by bacterial diseases, etc. A series of derivatives of cholesterol have a favorable action upon the heart and accelerate heart action. Oxycholesterol alleviates various skin afflictions, eczema, etc.

A large consumption of the sterols and their derivatives can also be reckoned with in other fields of therapeutics and pharmaceutics, when obtainable at a reasonable cost. I obtain the sterols as a by-product by my soap-making process.

The sterols, volatile under the conditions obtaining in my processes, are recovered along with the glycerin, from which they can be readily separated in the condensate.

It will seem, therefore, that the recovery of these sterol by-products is of increasing commercial importance, especially since by my processes they can be most cheaply obtained.

Odoriferous matters may also be present and/or formed during the saponification of the oils and fats. These may be very objectionable for soap making purposes, causing objectionable odors in the finished soap, etc. The objectionable impurities may be entirely removed from soaps made under the conditions of my invention.

My process also removes the highly disagreeable odors from such crude soap making materials as house grease, extraction grease and garbage grease, marine animal oils, etc., giving a resultant soap with a neutral or mild, agreeable odor. In the commonly used commercial method of soap making the oils and fats must be previously refined, and comparatively high grade oils and fats used, if a high grade soap is desired to be manufactured.

My process may also be applied to saponify saponifiable waxes. True saponifiable waxes contain higher mono-hydroxy alcohols, in place of glycerin, combined with high molecular weight fatty acids. Glycerin is a tri-hydroxy or trihydric alcohol.

Ordinary anhydrous soaps have relatively high melting points. The chemical literature teaches that mixtures of certain metallic soaps may have much lower melting points than the melting points of the individual soaps composing the mixture. Thus a certain mixture of calcium, magnesium and potassium soaps may melt as low as at a temperature of 150° C. when in an anhydrous state. I may also make use of such a mixture in my continuous process.

When I use the term "anhydrous," it means substantially anhydrous and free from all but possible traces of water.

In using the term "fat," "saponifiable material," in the claims, I intend the term to include saponifiable material of whatever nature containing not only true fatty acids but also similar acids which are unsaturated in varying degrees and of high molecular weight, e. g. fats and/or fatty oils or glycerides which are useful either singly or as mixtures in the manufacture of soaps by common soap-making methods. I also intend the term "saponifiable material" to include waxes of a saponifiable nature, free fatty acids derived from fats and/or fatty oils—as by the Twitchell process, etc.—and oxidation products of high molecular weight and of an acidic nature, derived from the oxidation of high molecular distillation products of petroleum, shale oil and other hydrocarbon oils, paraffin, waxes, etc., such as high molecular fatty acids, oxy-fatty acids, lactones, etc.

When I employ the term "fatty acids" it is to be interpreted as including true fatty acids, which are saturated monocarboxylic organic acids, as well as similar acids with varying degrees of unsaturation. By fatty acids of "high molecular weight" I imply mono-carboxylic organic acids containing from 8-carbon atoms upwards. Fatty acids of low molecular weight, while forming salts, do not form soaps in the accepted meaning of the term.

"Saponifying agent, medium, material" used herein includes all those substances which are adapted to produce a saponification.

When I employ the term "soap," it is to be interpreted as not only including alkali salts of saturated fatty acids, but also salts of alkalies or other bases with saturated or unsaturated monocarboxylic acids as well as salts of hydroxy monocarboxylic acids, whether saturated or not.

An inert salt, such as sodium silicate, borax, trisodium phosphate, may be added to the oil-alkali mixture before spraying. Such an addition facilitates the more rapid elimination of the glycerin from the soap.

Sodium silicate, borax, sodium perborate, sodium carbonate, trisodium phosphate, also other suitable substances, as additions, such as waxes, heavy mineral oils, can be either added to the mixture to be sprayed, before spraying, or can be sprayed into the reaction vessel separately. The resultant soap then contains this substance, or a mixture of these substances, in intimate combination—we have a "filled soap."

Again, steam itself may be the carrier of one or more chemically reactive substances, with which the fats or fatty oils, or fatty acids, react, e. g. ammonia gas, etc.

It is understood that when carrying out my process under superatmospheric pressure conditions, if such a procedure is desired, suitable adjustments have to be made in respect to the apparatus and variations in the process.

It is self-evident, as already stated, respecting my process and apparatus, that air must be rigidly excluded from the apparatus shown in Fig. I when in operation, otherwise the soap readily discolors.

It will accordingly seem that I have provided a method and an apparatus well adapted to attain, among others, all the ends and objects of the invention above enumerated.

Any changes could be made in this construction without departing from the scope or spirit of the below given claims. It is intended that all matter contained in the above description shall be interpreted as illustrative only and not in a limiting sense.

I claim:

1. The continuous process of making soap and glycerin, which consists in heating a mixture of a fat and a base to a temperature in excess of the melting point of the resulting anhydrous soap, spraying said mixture into a moving atmosphere of steam entirely free from air and superheated to a temperature above the melting point of the resulting anhydrous soap, conducting said anhydrous soap in spray form to a cooler atmosphere of steam sufficient to solidify the sprayed soap particles, and conducting off the volatile and non-volatile products liberated and formed by the saponification reaction.

2. The continuous process of manufacturing soap containing substantially no glycerin, which comprises the providing of an atmosphere of steam superheated to a temperature above the melting point of the resulting anhydrous soap and moving through a suitable heated retort, uniformly heating a fat and a base to a temperature above the melting point of the resulting anhydrous soap and projecting said fat and base in a finely divided state and as a spray into said moving atmosphere of superheated steam with a current of superheated steam, causing the finely divided particles of the fat and the base to intimately commingle in said moving atmosphere of superheated steam, thereby causing a saponification reaction wherein the soap particles are freed of moisture and glycerin, withdrawing the glycerin and other volatiles formed and liberated by the saponification reaction to a condenser, withdrawing said formed anhydrous soap particles into an atmosphere of steam held at a temperature below that of the melting point of the anhydrous soap maintaining both said atmospheres of steam under diminished pressure conditions, and then separately collecting the anhydrous soap particles and the glycerin and other volatiles.

3. The herein described continuous process of producing soap in a finely divided state, and glycerin, which consists in spraying separately a fat and a base together with a stream of superheated steam, by means of a compound spraying nozzle, more or less counter-current-wise into a zone through which passes a flowing stream of steam superheated to a temperature above the melting point of the resulting anhydrous soap, causing said sprayed particles to commingle in said zone thereby to produce a saponification reaction, allowing said soap particles to pass to a zone of steam of lesser temperature and below that of the melting point of the anhydrous soap particles, and conducting to a condenser the volatile products formed and liberated by the saponification reaction.

4. The herein described process for producing soap and glycerin, which consists in spraying in commingling relationship a fat, a base and superheated steam into a passing atmosphere of superheated steam, said fat and base having been preferably previously heated to a temperature in excess of 250° C., drawing the saponified material into another atmosphere of steam of a temperature below the melting point of the anhydrous soap produced in said first named atmosphere, drawing off the volatile constituents by the saponifying reaction and delivering them to a condenser, and then collecting and mechanically removing the anhydrous soap from said second atmosphere of steam.

5. The continuous process of producing soap from oxygen-containing organic bodies derived from the oxidation of petroleum oils, paraffin wax and other high-boiling hydrocarbon oils and containing high molecular weight saturated and unsaturated mono-carboxylic acids, oxy-carboxylic acids, lactones and the like, which consists in separately conducting a stream of said oxygenated organic bodies heated to a temperature above the melting point of the resulting anhydrous soap and a heated stream of a saponifying agent to a compound mixing and spraying means, whereby said streams of oxygenated bodies and of the saponifying agent are caused to intimately commingle, to react and to be sprayed, directing said spray more or less counter-current-wise in commingling relationship with a current of superheated steam passing through an operating chamber, conducting off to a condenser the steam and accompanying volatile unsaponifiable matter present and formed by the saponification reaction, permitting the sprayed particles of soap to precipitate by gravity through a cooler atmosphere of steam, in order to solidify said individual particles of soap, and collecting and removing the soap formed.

6. In the continuous separation of volatile unsaponifiable matter from saponifiable material containing the same, by saponification and distillation, the steps which comprise continuously delivering separate and properly ratioed heated streams of saponifiable material and a saponifying agent to a compound mixing and spraying means, continuously spraying the formed mixture in commingling relationship and counter-current-wise into a flowing stream of superheated steam passing through an operating chamber, thereby effecting practically complete saponification of said saponifiable material and separation and removal of the volatile unsaponifiable matter, permitting the hot liquid particles of the non-volatile saponified material to drop by gravity into a cooler atmosphere of steam, thereby effecting solidification of the individual particles of said saponified material.

7. In the continuous separation of volatile unsaponifiable matter from saponifiable material containing the same, by saponification and distillation, the steps which comprise heating separately the saponifiable material and a base to a temperature in excess of the melting point of the resulting anhydrous saponified product, continuously passing separate streams of the heated saponifiable material and the base to a compound mixing and spraying means, continuously spraying the formed mixture of saponifiable material and the base counter-current-wise into a continuously flowing stream of superheated steam passing through a reaction and extraction chamber, continuously passing the formed non-volatile saponified product in spray form to a cooler atmosphere of steam sufficient to solidify the individual sprayed particles of the saponified product, and continuously conducting off and condensing the volatile unsaponifiable matter and the steam.

HENRY W. F. LORENZ.